April 9, 1957   W. KOBIELUSH   2,788,166
ADJUSTABLE PORTABLE STEPS FOR TRAILERS
Filed Feb. 10, 1954
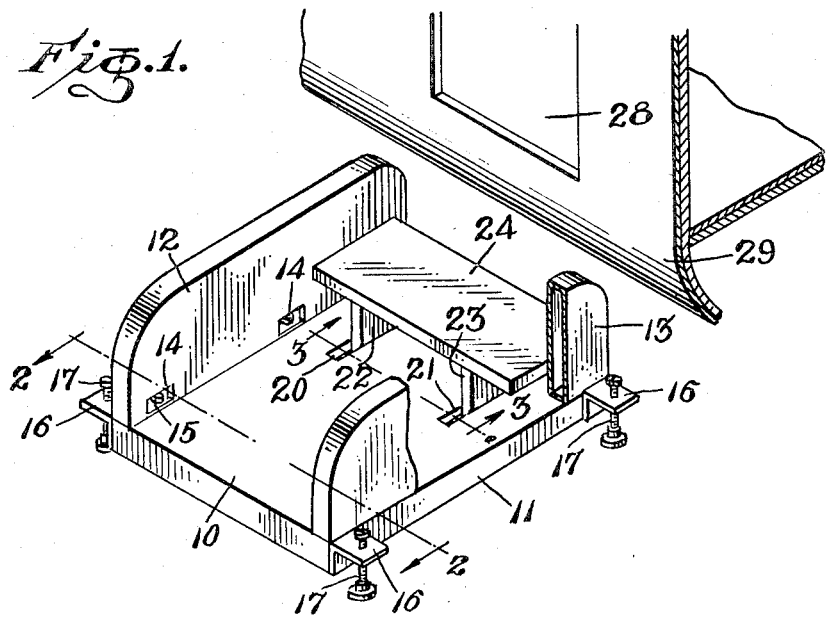
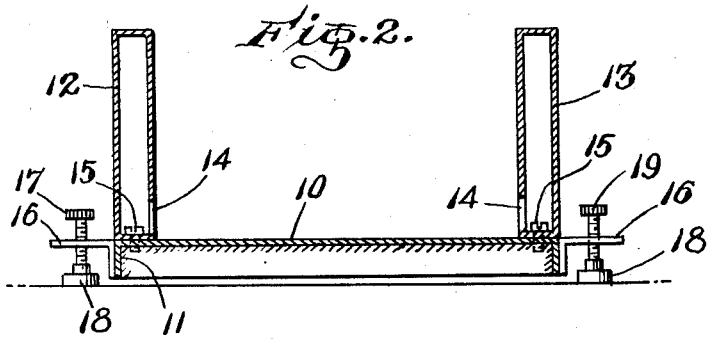
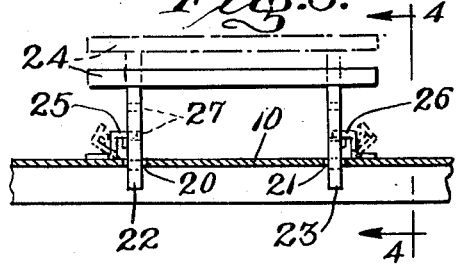
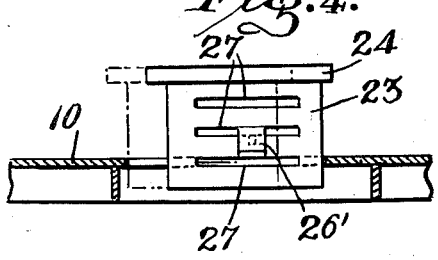
INVENTOR
*William Kobielush,*

United States Patent Office 2,788,166
Patented Apr. 9, 1957

2,788,166

ADJUSTABLE PORTABLE STEPS FOR TRAILERS

William Kobielush, Englewood, Colo.

Application February 10, 1954, Serial No. 409,375

2 Claims. (Cl. 228—1)

This invention relates to an adjustable portable step for trailers.

It is an object of the present invention to provide an adjustable portable step for trailers which can be carried in the trailer and inserted and adjusted to different heights in front of the door of the trailer and to eliminate injury to trailer users where unsteady blocks or blanks are often used and piled in such a manner as to often fall over.

It is another object of the invention to provide an adjustable step for trailers where both steps can be adjusted relative to each other and relative to the ground.

Other objects of the invention are to provide a portable, adjustable steps for trailers which is of simple construction, has a minimum number of parts, inexpensive to manufacture, easy to assembly, durable, light in weight, of pleasing appearance, easy to adjust, compact, efficient and effective in use.

For a better understanding of the invention, reference may be had to the following detailed description taken in connection with the accompanying drawing, in which:

Figure 1 is a perspective view of the steps located below the door of the trailer and with portions of one side of the step broken away to show the construction and arrangement of the second step;

Fig. 2 is a vertical sectional view taken on line 2—2 of Fig. 1;

Fig. 3 is a vertical sectional view taken on line 3—3 of Fig. 1 at the location of the upper step;

Fig. 4 is an elongated sectional view taken generally on line 4—4 of Fig. 3.

Referring now to the figures, 10 represents a bottom step member formed of metal with a depending peripheral flange 11. To the sides of this bottom member 10 there can be connected two side members of hollow formation, and as indicated generally at 12 and 13. These members are rounded on their ends and fit flush upon the top surface of the bottom step member 10. On the inner side of the hollow members 12 and 13 are openings 14 which provide access with a tool or wrench for the purpose of tightening machine screw 15 in order to fix the lower edges of the side members 12 and 13 to the bottom step member 10.

To the sides of the flange 11 there are respectively connected at the forward and rearward ends thereof laterally extending brackets 16 in which are threaded adjusting screws 17 having bottom feet 18 and a hand knob 19. By adjusting the screw 17 the height of the bottom step member 10 can be adjusted.

At the rear of the front step 10 are parallel slots 20 and 21 through which depend adjustable risers 22 and 23 having a top step plate 24.

On the top of the bottom step member 10 are hingeable devices 25 and 26 adapted to respectively be releasably connected to any one of a series of vertically spaced openings 26' in depending members 22 and 23. Upon hinging outwardly the retaining devices 25 and 26, the step can be adjusted to any one of three elevations and upon return of the devices to the openings, the step will be held in an elevated position above the bottom step member and adjacent to door 27 of trailer 28, as shown in Fig. 1. The openings 26' are elongated and likewise the openings 20 and 21 in the bottom step member are elongated so that the rear step can be adjusted fore and aft in proper location for the door 27 of the trailer.

It should thus be seen that not only can the bottom step be elevated to different locations above the ground but the rear and top step can likewise be elevated or lowered relative to the bottom step.

It should be apparent that there has been provided a construction that is easily assembled and made from from easily formed parts.

While various changes may be made in the detail construction, it shall be understood that such changes shall be within the spirit and scope of the present invention as defined by the appended claims.

What is claimed is:

1. An adjustable portable step adapted for use with automobile trailers comprising a bottom step, adjustable feet members located on the respective opposite sides of said bottom step member and engageable with the ground and adjustable to even the step with relation to the trailer, a rear step, said bottom step having transversely spaced elongated parallel slots therein at the rear, transversely spaced depending riser portions extending respectively through the elongated slots in the bottom step member and connected to said rear step, each of said riser portions having vertically spaced elongated slots, releasable holding bracket devices pivotally mounted on the bottom step and engageable selectively with said vertically spaced slots of the riser portions whereby to hold the rear step at different elevations with respect to the bottom step.

2. An adjustable portable step according to claim 1, including side members extending along the sides of the bottom member in a vertical manner and outwardly of the upper step, said bottom step elongated slots being of greater length than said riser portions whereby to permit a longitudinal adjustment of the rear step along the bottom step.

References Cited in the file of this patent

UNITED STATES PATENTS

| | | |
|---|---|---|
| D. 157,436 | Rogers | Feb. 21, 1950 |
| 996,236 | Goding | June 27, 1911 |
| 1,690,025 | Loveridge | Oct. 30, 1928 |
| 2,177,174 | Eccles | Oct. 24, 1939 |